March 17, 1953     J. L. TRUNNELL     2,631,817
TIRE SPREADER
Filed June 1, 1951
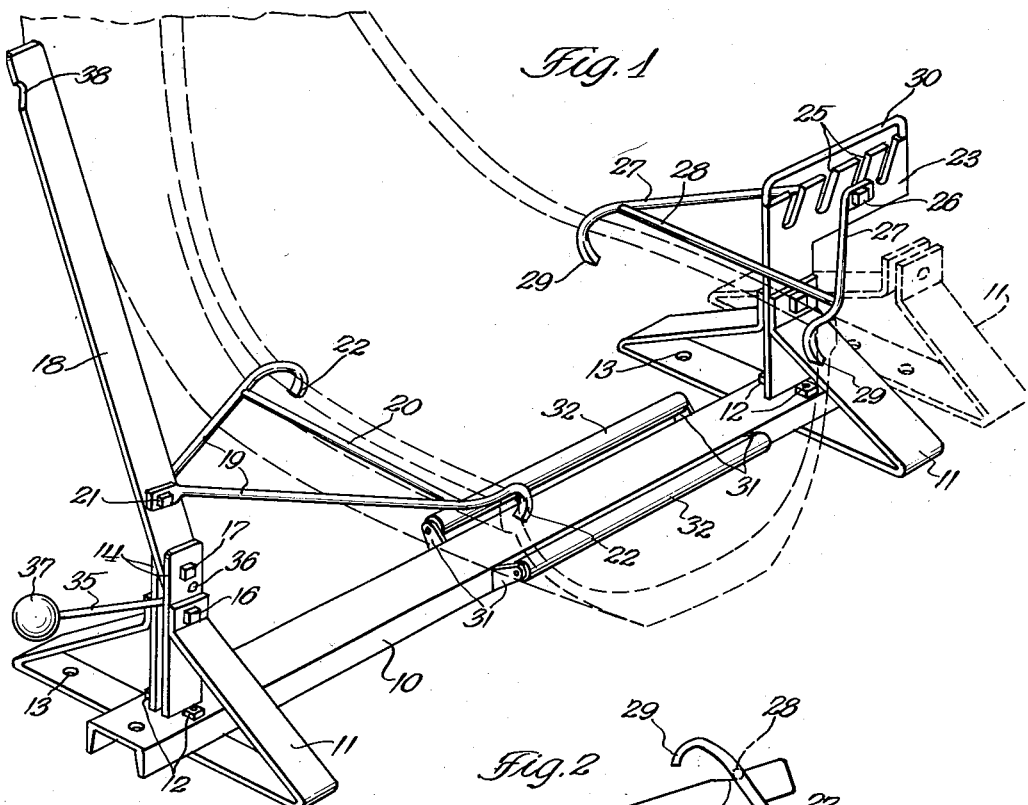
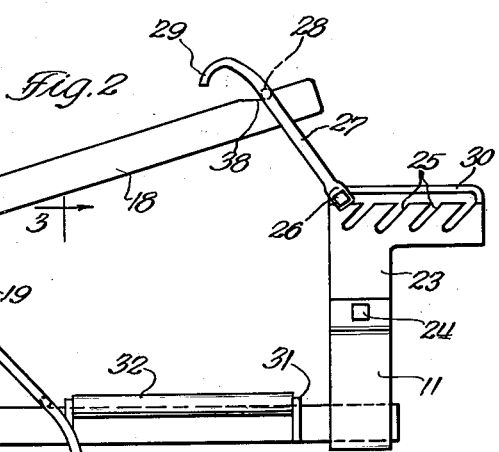
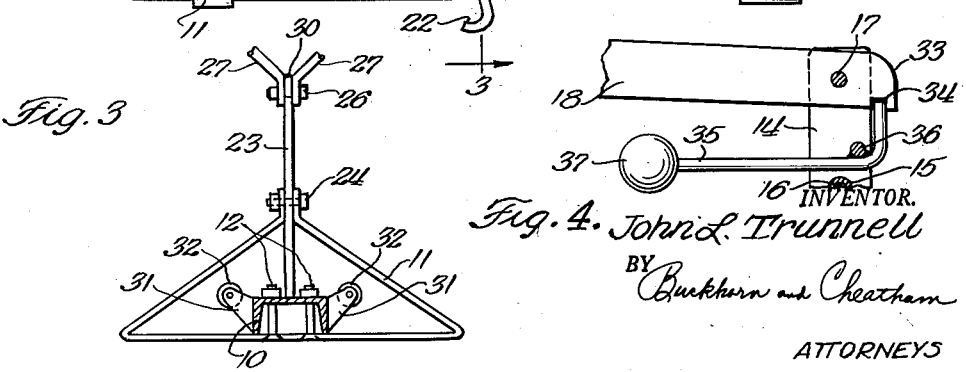
INVENTOR.
John L. Trunnell
BY Buckhorn and Cheatham
ATTORNEYS

Patented Mar. 17, 1953

2,631,817

UNITED STATES PATENT OFFICE 2,631,817

TIRE SPREADER

John L. Trunnell, Cottage Grove, Oreg.

Application June 1, 1951, Serial No. 229,317

1 Claim. (Cl. 254—50.4)

The present invention relates to a device for inspecting tire casings in order that defects or imbedded material in the interior thereof may be discovered. Inspection of a tire casing requires a careful examination of its inside surface, which is rendered difficult by its shape and the relative rigidity of the walls of the tire casing, particularly in larger casings such as used on trucks and tractors.

The principal object of the present invention is to provide means whereby the walls of a tire casing may be spread apart, presenting the inner surface thereof in a flattened condition for inspection over a considerable area, the machine comprising means whereby the position of the tire casing may be shifted so as to permit the inspection of circumferentially spaced areas thereof in rapid succession.

A further object of the present invention is to provide a device of the foregoing character which may be conveniently carried about from place to place and which will nevertheless be stable when in use.

A further object of the present invention is to provide a device of the foregoing character which may be rapidly adjusted to accommodate different sizes of tire casings.

A further object of the present invention is to provide a device of the foregoing character including an operating lever which may be locked in position to hold a tire casing open, and which may be folded inwardly to provide a carrying handle for ease of transportation.

The foregoing and other objects of the present invention will be more readily apparent from inspection of the following specification taken in connection with the accompanying drawing wherein like numerals refer to like parts throughout, while the features of novelty will be more distinctly pointed out in the appended claim.

In the drawing,

Fig. 1 is a perspective view of the invention in use;

Fig. 2 is an end view of the invention;

Fig. 3 is a vertical section taken substantially along line 3—3 of Fig. 1; and

Fig. 4 is an enlarged detail view with parts broken away.

The preferred form of the invention comprises a main structural member preferably consisting of an inverted channel bar 10, the same forming an elongated base. A pair of triangularly shaped brackets 11 are fixed to the opposite ends of the base member 10 preferably by means of removable bolts 12 having countersunk heads extending through the lower surfaces of the brackets, the brackets being thus removable in order that the device may be shipped in a smaller package than would otherwise be required. The brackets spread laterally far enough from the base so that the device will not tip over when in ordinary use; however, suitable openings 13 may be provided in the lower surface thereof by means of which the device may be bolted to a table or other suitable support for use in a permanent position. A first upright is provided at one end of the base, the same comprising a laterally spaced pair of upright bars 14 having their lower ends welded to the upper surface of the base 10 and their upper ends held in spaced apart relation by a spacer collar 15 surrounding the intermediate portion of a bolt 16 joining the upper ends of the arms of the triangular bracket 11 to the upright. A pivot bolt 17 extends across the upper portions of the uprights 14 and a lever 18 is pivotally mounted thereon between the arms 14, the lever being movable toward and away from the base 10 in a vertical plane. First hook means comprising an A-frame consisting of a pair of hook arms 19 and a cross brace 20 are pivotally attached to an intermediate portion of the lever 18 by a pivot bolt 21. The arms 19 terminate in downwardly extending hooks 22 adapted to engage over a tire casing bead as illustrated in Fig. 1.

A second upright consisting of a vertically positioned plate 23 is mounted at the opposite end of the base as by means of having its lower end welded to the upper surface of the base 10, and is braced in position by a bolt 24 joining the upper ends of the arms of the end bracket 11 thereto. The plate 23 terminates in a rearwardly extending extension in which are provided a plurality of rearwardly inclined notches 25. Second hook means are mounted upon the plate 23 as by means of a bolt 26 connecting the arms 27 thereof at the apex of the frame member comprising the arms 27 and the crossbar 28 in a suitable one of the notches 25 determined by the size of the casing being inspected. The arms 27 likewise terminate in hooks 29 adapted to engage the opposite tire casing bead. The upper edge of the plate 23 is horizontally disposed and a guard rod 30 is welded to the upper edge thereof, the guard rod having downwardly turned ends whereby the intermediate portion thereof is spaced from the upper edge of the plate 23 to provide a horizontal slot through which the bolt 26 may be moved when adjusting the relative position of the second hook means on the plate.

The base is preferably provided with laterally extending, longitudinally spaced pairs of pivot ears 31, the same supporting a laterally spaced pair of rollers 32 extending longitudinally of the opposite sides of the base 10 and having their upper edges slightly elevated above the upper surface thereof. The rollers 32 thus support the tire casing so that it may be revolved in order to position successive portions thereof adjacent the spreading means.

The lever 18 is provided with a curved end constituting a cam surface 33 and the upper edge of the lever 18 adjacent the cam surface is provided with a locking notch 34 which faces upwardly when the lever is swung forward to overlie the base 10, but which faces downwardly when the lever is swung outwardly in the opposite direction to its fullest extent. A latch bar 35 is pivotally mounted between the upper ends of the upright bars 14 upon a rock shaft 36. The inner end of the latch bar is turned upwardly to provide a catch which may engage in the notch 34 when the lever is swung outwardly as seen in Fig. 4, and which normally bears against the lower surface of the lever in any other position of use, being maintained in that position by a weight 37 at the opposite end of the latch bar. When the lever is being operated rapidly between shifting movements of the tire casing the latch bar will not interfere with such movement, but when it is desired to hold the tire casing open in a stationary position the lever 18 is swung outwardly to its fullest extent whereupon the tip of the latch bar will drop into the notch 34 and hold the lever in position.

The upper surface of the lever 18 is also provided with a second notch 38 adjacent the free end of the lever. The notch 38 may engage the crossbar 28 on the second hook means in order to provide a carrying handle when the lever is swung forwardly across over the top of the base 10. When in this position the cross brace 20 of the first hook means lies upon the base 10 as seen in Fig. 2.

When the invention is being used it may be bolted in position on a stationary support or may be carried about from place to place in a convenient manner by engaging the cross brace 28 in the notch 38. When it is in proper position a tire casing may be placed on the rollers 32 and revolved about its axis so as to position successive portions of the tire casing above the base. The second hook means is adjusted to suit the particular size of tire casing being inspected, by placing the bolt 26 in the suitable notch 25. The opposed hook means are engaged with the opposed beads of the tire casing and the lever pulled outwardly to spread the tire casing so that the interior thereof may be inspected. When it is desired to hold the tire casing in open position, the lever is locked in position by pulling it outwardly to an extreme position whereupon the tip of the latch bar 35 engages in the notch 34. When it is desired to release the lever 18, the weight 37 is lifted whereupon the lever 18 may be swung back to release the pressure on the sides of the tire casing.

Having illustrated and described a preferred embodiment of my invention, it should be apparent to those skilled in the art that the same permits of modification in arrangement and detail. I claim as my invention all such modifications as come within the true spirit and scope of the appended claim.

I claim:

A device for spreading tire casings comprising an elongated base, a first upright mounted near one end of said base, a second upright mounted near the other end of said base, a first pivot mounted on said first upright, a lever pivotally mounted on said first pivot, said pivot extending transversely with respect to the direction of elongation of said base and said lever being mounted for pivotal movement in a vertical plane including said base, said lever having a locking notch in the edge thereof which is uppermost when said lever overlies said base, first hook means for engaging a casing bead pivotally connected to said lever and extending over said base toward said second upright, means providing an elongated slot in said second upright, said slot extending horizontally in the direction of elongation of said base, the lower edge of said slot having a plurality of notches therein, a second transverse pivot movably engageable in said notches, second hook means for engaging the opposed casing bead pivotally carried by said second pivot and extending over said base toward said first upright, and weighted latch means pivotally mounted on said first upright and automatically engageable in said locking notch when said lever is swung to an extreme position away from said second upright means.

JOHN L. TRUNNELL.

REFERENCES CITED

The following references are of record in the file of this patent:

UNITED STATES PATENTS

| Number | Name | Date |
|---|---|---|
| 301,881 | Goodloe | July 15, 1884 |
| 1,990,611 | Mutchler | Feb. 12, 1935 |
| 2,058,100 | Peaden et al. | Oct. 20, 1936 |
| 2,173,795 | Fisher | Sept. 19, 1939 |
| 2,338,278 | Benner | Jan. 4, 1944 |
| 2,496,389 | Goodman | Feb. 7, 1950 |